United States Patent [19]

Gleyze et al.

[11] Patent Number: 5,370,492
[45] Date of Patent: Dec. 6, 1994

[54] AUTOMATED STORES AND NOVEL TYPE OF TRUCK MAKING IT POSSIBLE FOR THE PRODUCTS TO BE POSITIONED IN OR EXTRACTED FROM THE STORAGE ZONES

[75] Inventors: Jean Gleyze; Frédéric Zoller, both of Aubenas, France

[73] Assignee: Societe d'Etude en Mecanisation et Automation (CIMAT), France

[21] Appl. No.: 94,136

[22] PCT Filed: Dec. 22, 1992

[86] PCT No.: PCT/FR92/01226

§ 371 Date: Jul. 30, 1993

§ 102(e) Date: Jul. 30, 1993

[87] PCT Pub. No.: WO93/12998

PCT Pub. Date: Jul. 8, 1993

[30] Foreign Application Priority Data

Dec. 24, 1991 [FR] France .................. 91 16337

[51] Int. Cl.⁵ ............................................. B65G 1/04
[52] U.S. Cl. ..................................... 414/279; 414/284
[58] Field of Search ............... 414/279, 284, 239–241, 414/234

[56] References Cited

U.S. PATENT DOCUMENTS 3,880,299  4/1975  Zollinger et al. ............. 414/279 X
4,395,181  7/1983  Loomer ......................... 414/279 X
4,505,630  3/1985  Kaschner et al. ............. 414/284 X
5,033,928  7/1991  Suominen ..................... 414/279 X
5,069,592  12/1991  Galperin ........................ 414/240
5,135,344  8/1992  Kita et al. ..................... 414/279 X

FOREIGN PATENT DOCUMENTS 2651823  3/1991  France .
0957200  1/1957  Germany .
2032867  5/1980  United Kingdom ............ 414/279

Primary Examiner—David A. Bucci
Attorney, Agent, or Firm—Harris Beach & Wilcox

[57] ABSTRACT

Automated stores comprising a plurality of superimposed levels (1a, 1b, 1c. .), subdivided into parallel corridors (2a, 2b, 2c. .) on either side of which are arranged rows of racks or cells forming storage zones (3) for the products which are handled by means of autonomous trucks (4) brought to a predetermined level by at least one lift unit (5). Each storage level (1a, 1b, 1c. .) includes a set of rails forming a plurality of networks (6) pointing along the longitudinal X axis of the stores inside each inter-column space (2a, 2b, 2c) and one network (7) pointing along the transverse Y axis perpendicular to and at the end of the inter-column spaces. The autonomous trucks (4) include two-way forks on which the product to be handled rests.

2 Claims, 6 Drawing Sheets

AUTOMATED STORES AND NOVEL TYPE OF TRUCK MAKING IT POSSIBLE FOR THE PRODUCTS TO BE POSITIONED IN OR EXTRACTED FROM THE STORAGE ZONES

BACKGROUND OF THE INVENTION

1. Field of the Invention

The present invention relates to an improvement to automated installations which make it possible to store and/or to make available various products, which installations, in the rest of the description, will be denoted by the expression "stores". It also deals with a novel type of truck making it possible to provide the displacements of the products inside such stores including a plurality of superimposed levels, which truck could possibly also be used for providing the displacements of products on just one level, for example the ground.

2. Discussion of the Prior Art

In numerous industrial fields, there is the problem of having to store products temporarily, this being true both for the company's own needs in terms of its business activity (raw materials, piece parts. .), and for the articles manufactured by the company which are to be stored temporarily before being made available to the user or purchaser.

Very numerous proposals have been made to date for producing automatic stores making it possible not only to limit manual interventions to a minimum, but also to store, in a given volume, the greatest possible number of products.

To date, the most widespread solution for producing automatic stores consists in producing units in which the storage zones are substantially in the form of "columns" of great height, subdivided in the vertical direction into a plurality of superimposed levels constituting rows of racks, or cells whose dimensions are a function of the products to be stored, these "columns" being separated from each other by aisles along which there move units commonly denoted by the expression "transfer loader" or "transverser".

In general, such stores therefore define three axes along which the products are displaced, namely:

X: longitudinal axis of the stores, of the furniture or columns, of the aisles;

Y: transverse axis perpendicular to the furniture (columns), and to the aisles;

Z: vertical axis.

To date, as stated previously, in order to provide the handling of the products inside such storage units, equipment designers propose automatic or guided machines of the "transfer loader" or "traverser" type, which make it possible to take up and to store pallets or containers in the cells of the columns which constitute the lateral faces of each aisle. Such automatic handling machines all have in common the fact that they run either directly on the ground, or on rails fixed to the ground. They may or may not change aisle. They all include a lift system which makes it possible to bring the member for handling the pallet or the container opposite the cell in question.

Taking account of the fact that the height of the stores becomes greater and greater, these machines become very tall (it being possible for the height to reach several tens of metres), with, in particular, a substantial toll on their cost and on the need to have an increasingly restrictive geometry of, on the one hand, the pallet handler and, on the other hand, the ground.

In order to provide the handling of products on the ground, it has been proposed to produce autonomous trucks which can effect changes in direction, these trucks being either guided by rails or automatically guided and in general being equipped with one or more guidable wheels allowing them to effect turns. Such a design of truck therefore gives rise to the production of displacement circuits which, in the change of direction zones, involve a substantial surface area, given that the truck moves in a curve which consequently, decreases the zone available for actual storage, for a given surface area.

Moreover, such trucks can only be displaced on a single level and they cannot work equally well on several different levels.

SUMMARY OF THE INVENTION

Now, there has been found, and it is this which forms the subject of the present invention, a simple solution which is economical and easy to implement and which makes it possible to solve the drawbacks of the prior solutions by the fact that it allows the production of storage units which occupy only a minimum surface area on the ground, thus making it possible not to penalise the useful volume of the overall stores.

In general, the novel automated stores in accordance with the invention is in the form of a unit comprising a plurality of superimposed levels, each level being subdivided into parallel corridors on either side of which are arranged rows of racks, or cells, whose dimensions are a function of the products to be stored, the products being positioned in and removed from the storage zones by means of autonomous trucks:

the said trucks being brought to a predetermined level by means of at least one lift unit, and each storage level including a set of rails forming networks, one pointing along the longitudinal axis of the stores inside each intercolumn space and the other pointing along the transverse axis;

the autonomous trucks including two permutable chassis each equipped with sets of wheels, one of which can be associated with the rails pointing along the X axis, the other with the rails pointing along the Y axis, characterised in that:

the said networks pointing along the longitudinal axis X of the stores and along the transverse axis Y consist of:

a plurality of networks pointing along the longitudinal axis X of the stores inside each inter-column space;

a single network pointing along the transverse axis Y perpendicular to and at the end of the inter-column spaces;

the autonomous trucks including means (two-way forks) on which the product to be handled rests in order to position it in and extract it from a storage compartment.

Advantageously and in practice, according to a preferred embodiment in accordance with the invention, possibly making it possible to use the said trucks to provide transportation of various equipment on a single level, the two elementary chassis can move with respect to one another along the vertical axis:

one of the chassis, termed "outer chassis", including driving and supporting wheels necessary for the displacements along the X axis, as well as rollers for lateral guidance along the two axes X and Y;

the second chassis, termed "inner chassis", supporting the driving and supporting wheels necessary for the displacements along the Y axis, as well as the two-way forks on which the product to be handled rests (for positioning in or extraction from a storage compartment).

Moreover, if the storage unit in accordance with the invention includes rails for guidance along the X axis at each storage level, the guide rails making it possible to effect the displacements along the Y axis may be located either at just one of the ends of the corridors, or at both ends.

Each truck moreover includes means making it possible to provide these displacements automatically, and more particularly, a programmable automaton or its computer equivalent capable of storing the information necessary for executing a sequence of operations.

In the lift or lifts making it possible to provide the displacements along the vertical axis Z, a unit allows the automaton of the truck to be in communication with the computer making it possible to manage the movements. This connection may also be permanent by means of radio; the latter solution, however, has the drawback of being less reliable. The lift or lifts making it possible to provide the displacements of the trucks along the vertical axis Z may be arranged either outside the corridors and opposite the latter or, preferably, incorporated right inside the stores.

By virtue of such a unit, it is therefore possible to produce stores including a minimum of wasted space for circulation of goods.

BRIEF DESCRIPTION OF THE DRAWINGS

The invention and the advantages which it brings will, however, be better understood by virtue of the embodiment example given hereafter by way of non-limiting indication, which is illustrated by the appended drawings in which.

DETAILED DESCRIPTION OF THE PREFERRED EMBODIMENT

Figure 1:
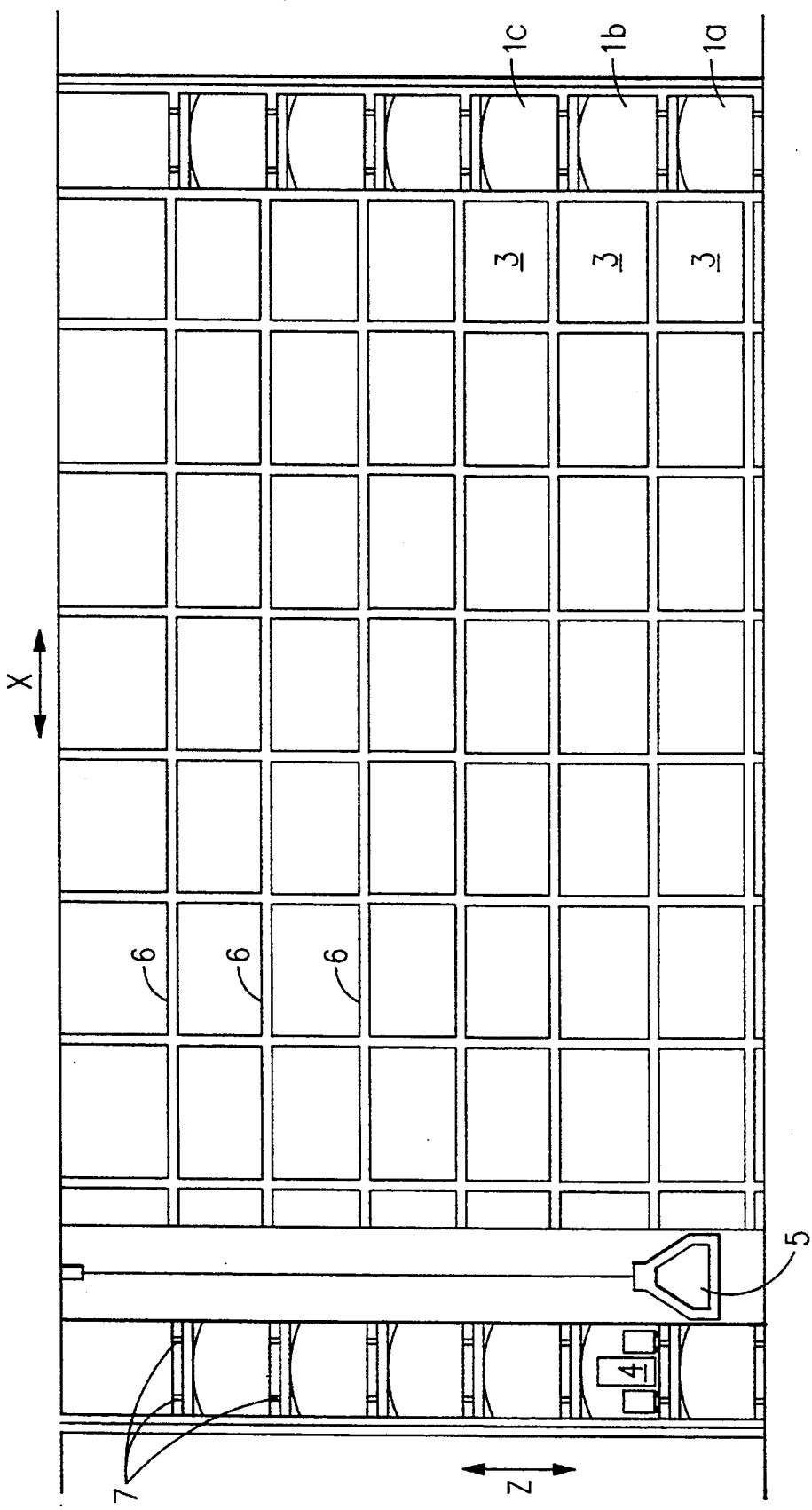
FIGS. 1 and 2 are respectively elevation and plan views of an automatic stores produced in accordance with the invention.
Figure 2:
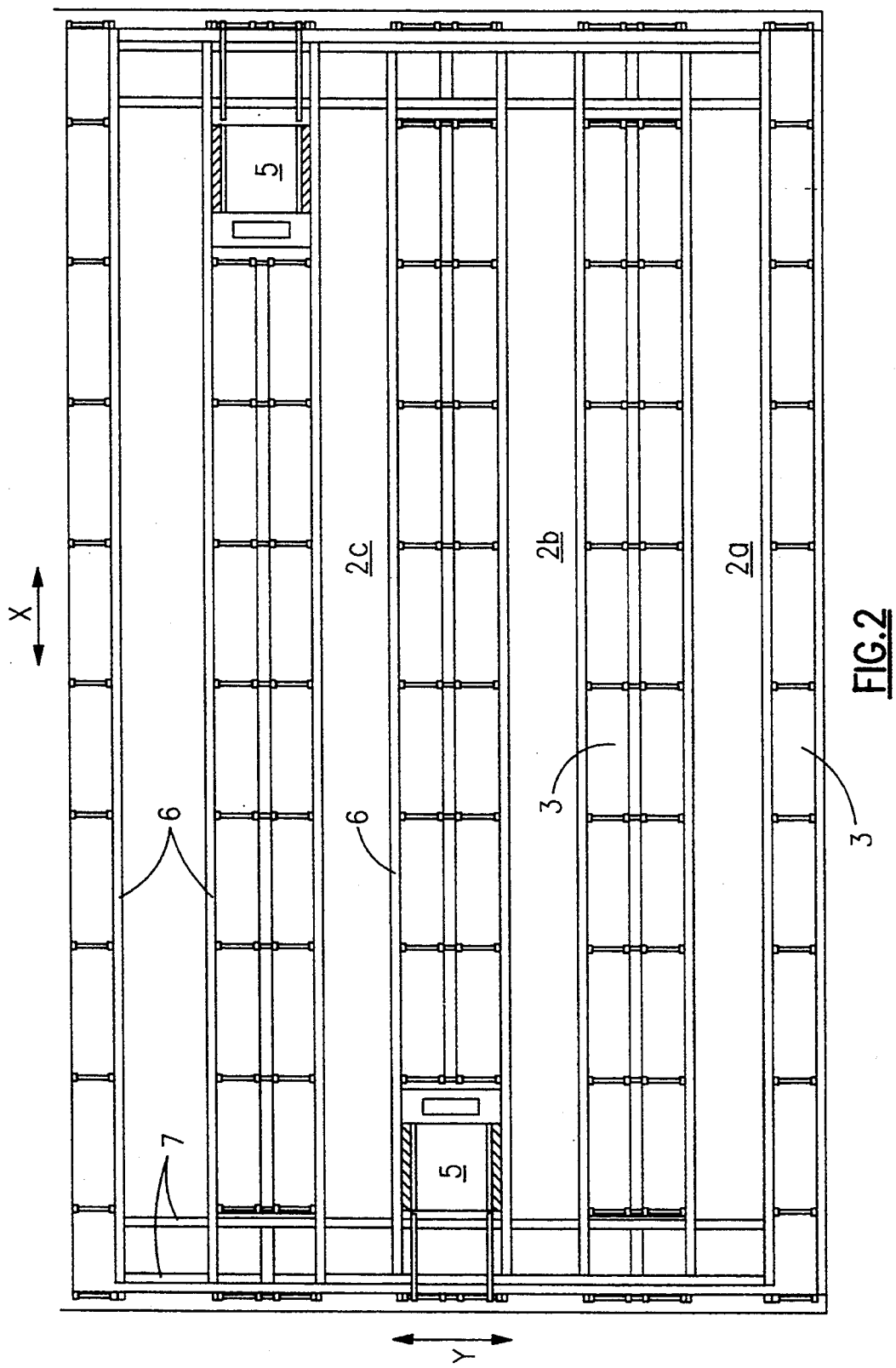
Figure 3:
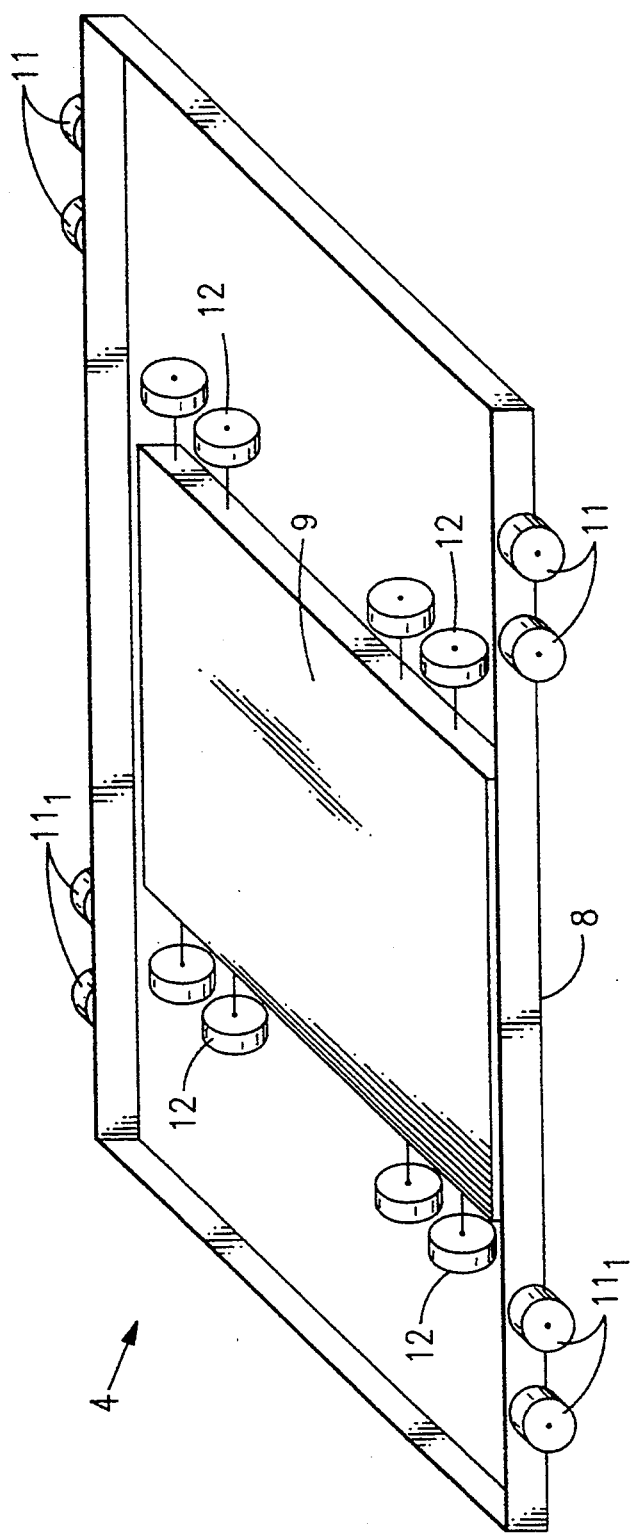
FIG. 3 is a diagrammatic view in perspective showing the general structure of an autonomous truck which also forms part of the invention and which can be used inside such an automatic stores.
Figure 4:
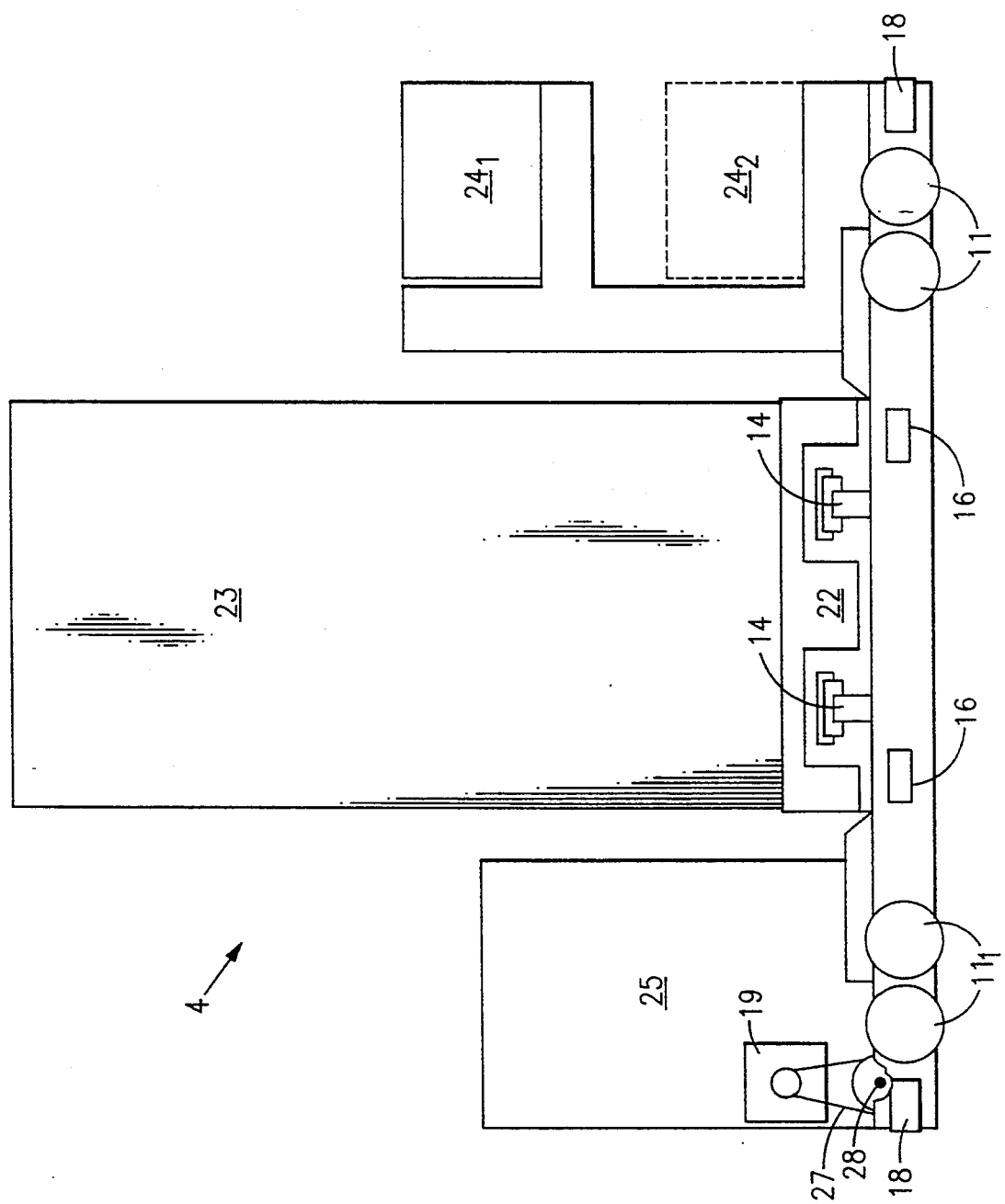
FIGS. 4, 5 and 6 are respectively detailed side elevation, plan, and end-on views of such an autonomous truck illustrated in FIG. 3.
Figure 5:
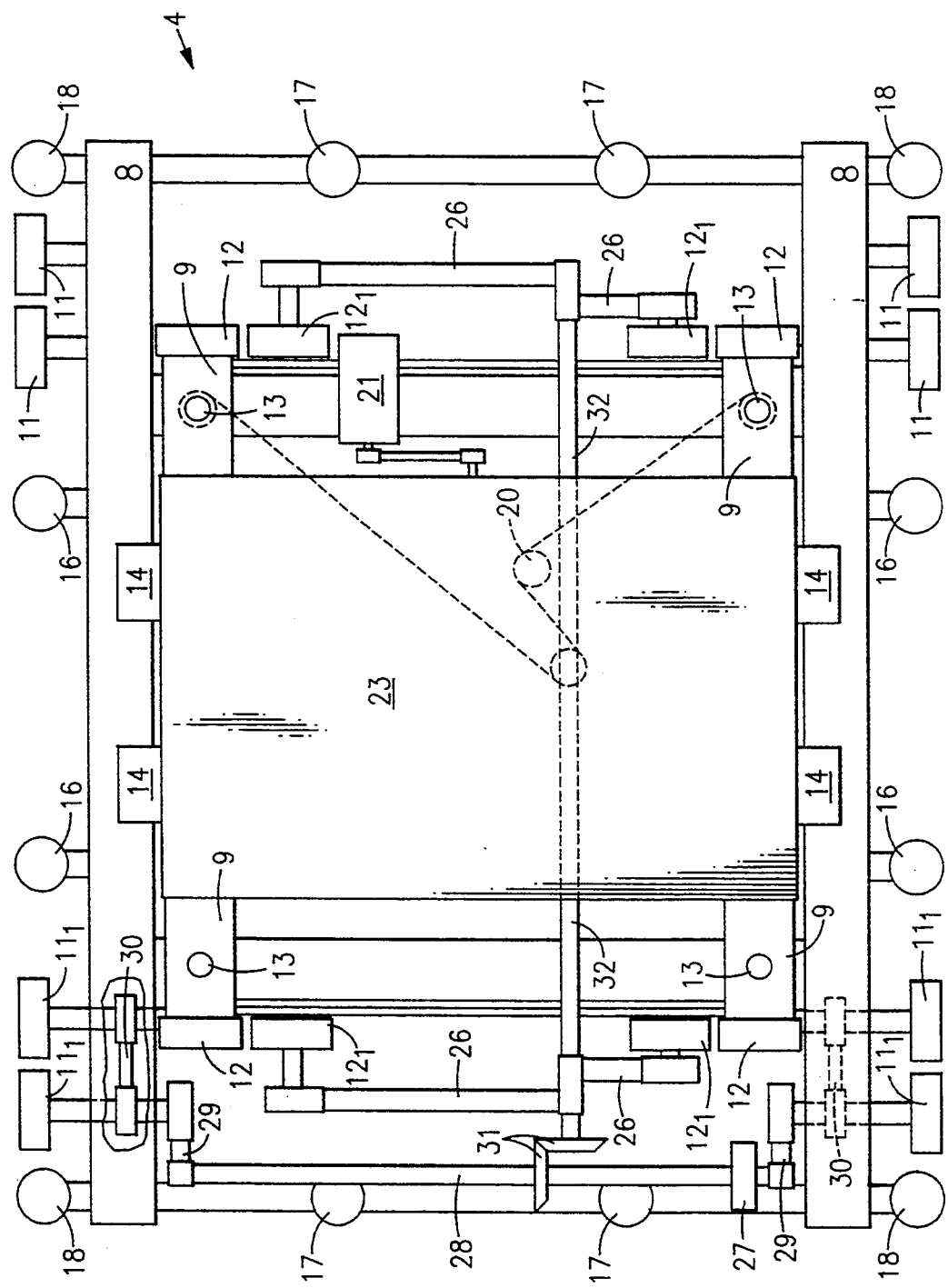
Figure 6:
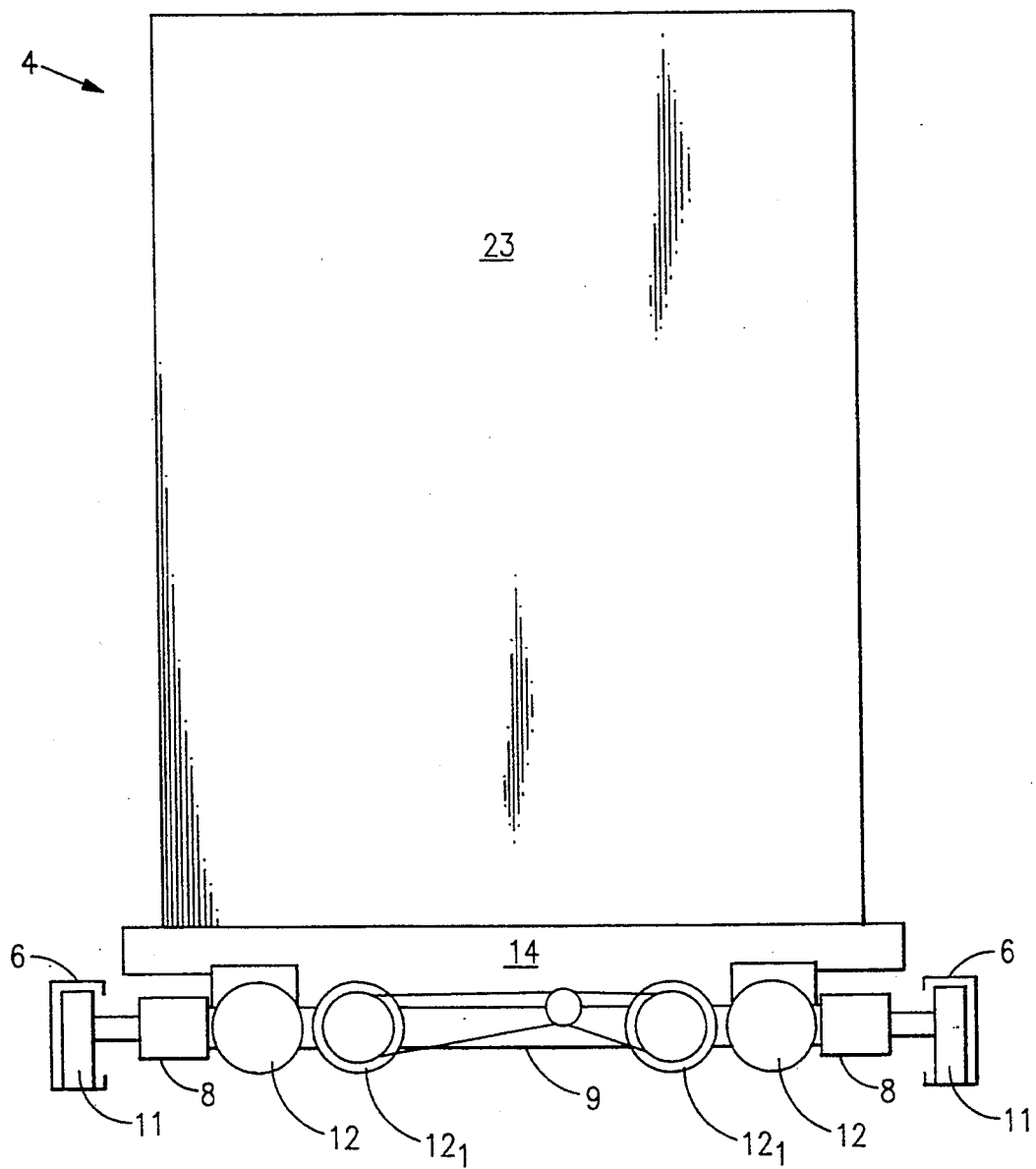

If reference is made to the appended drawings, the overall structure of the stores in accordance with the invention, which emerges more particularly from FIGS. 1 and 2, is as follows.

Such a stores is therefore in the form of a unit of parallelepipedal general shape, whose dimensions are determined as a function of the storage volume desired. Such a stores includes a plurality of superimposed levels ($1a$, $1b$, $1c$. .), each level being subdivided into parallel corridors ($2a$, $2b$, $2c$. .) on either side of which are arranged rows of racks or cells denoted by the single reference (3), whose dimensions are a function of the products to be stored. Such a structure is produced by assembling uprights, girders and cross-members, this being in a known manner.

The positioning of the product in and its removal from storage zones (3) takes place by means of autonomous trucks denoted by the overall reference (4), the said trucks (4) being brought to a predetermined level by means of at least one lift unit (lift) (5).

In accordance with the invention, such a stores is characterised in that each level ($1a$, $1b$, $1c$. .) includes a set of rails (6) pointing along the X axis of the said stores arranged at each level inside each of the corridors or aisles ($2a$, $2b$, $2c$. .) and a set of rails (7) also at each level pointing along the transverse axis Y perpendicular to the aisles ($2a$, $2b$, $2c$. .). In the embodiment illustrated in FIGS. 1 and 2, the stores in accordance with the invention includes two sets of rails (7) pointing along the Y axis, one at each end of the stores. Moreover, two lift systems (5) are also provided, incorporated right inside the said stores, serving each end.

According to another essential characteristic of a stores in accordance with the invention, the autonomous trucks (4) used in such a stores are designed so as to be displaced equally well on the sets of rails pointing along the axes X or Y. In order to do this, in the embodiment which also forms part of the invention and which emerges from FIGS. 3, 4, 5 and 6, the said autonomous trucks (4) essentially include two permutable chassis (8) and (9), each equipped with sets of wheels making it possible to associate one of the chassis with the rails (6) pointing along the X axis, the other with the rails (7) pointing along the Y axis.

One of the chassis (8), termed "outer chassis", supports the following members:

the driving wheels ($11_1$) and supporting wheels (11) necessary for the displacements along the X axis;

the rollers necessary for the lateral guidance along the two axes:
. (16) along X
. (17) along Y
. (18) along X and Y the ball screws (13) which provide the connection and relative movement of the two chassis;

the motor (20) and the belt for actuating these screws;

the motor (19) which, by means of the belt (27) actuates the shaft (28), which by means of the belts (29) and (30) actuates the wheels ($11_1$) (motorisation along X), then, by means of the bevel pair (31) actuates the shaft (32) and the four belts (26);

the motor (21) which actuates the translation of the two-way forks (14);

the supports of the battery blocks ($24_1$) and ($24_2$);

the electrical cabinet (25).

The inner chassis (9) supports the following members:

the bearings of the ball nuts on which it is mounted;

the driving wheels ($12_1$) and supporting wheels (12) necessary for the displacement along Y;

the two-way forks (14) on which the pallet (22) and its load (23) rests;

coming from the chassis (8), belts (26) which actuate the driving wheels ($12_1$) (motorisation along Y).

The geometry of the mounting of these belts (26), the variation in distance between centres of which is negligible during the relative displacement of one chassis with respect to the other, makes it possible, from a single motorisation, to actuate the two operational axes X and Y. Since the transmission always remains positive, this makes it possible also to use just one encoder and just one programme for guiding the positioning along these axes.

Such a storage unit operates in the following way.

The truck is in a lift, a pallet or container is placed on the two-way forks; the outer chassis (8) is in the low position and the unit rests on the wheels (11) and ($11_1$).

The lift is positioned, its rails aligned and level with those of the fixed network of the level in question. The order to effect its mission is given to the truck. It leaves the lift which becomes available to go and transfer another truck. The truck (4) which has just left the lift (5) runs on the fixed network as far as the intersection with the rails (7). It stops precisely on this intersection.

This inner chassis (9) is lowered, the wheels (12) and ($12_1$) bear on the rails (7) and the outer chassis rises. The wheels (11) or ($11_1$) leave the rails (6). The truck (4) starts to move along Y and is displaced as far as the crossroads corresponding to the aisle where it is to deposit its pallet.

It stops precisely at the centre of this crossroads. The outer chassis is lowered, the truck resumes its operational position along X.

It penetrates into the aisle and is positioned precisely in front of the cell where it is to deposit its pallet. In the position in which it finds itself - inner frame in the high position - the forks and the pallet pass above the rail and the rear stringer of the cell.

The forks are deployed, the pallet is brought above its storage position.

The frames reverse their relative positions.

Since the wheels of the inner frame are not supported, it is the pallet which is placed on the rail and the rear stringer, then, with the movement continuing, the forks disengage vertically from the pallet. The forks are retracted to the central position. The frames reverse their position, the truck may depart again either to go and look for a pallet in the aisle in which it is located, or in another on the same level - the operations would then be the same as those described, but in the reverse order - or to return into a lift.

Such a storage unit has the following advantages with respect to the prior solutions:
 the change in direction at right angles is effected in the minimum amount of space;
 the configuration described makes it possible to have only two motorisations for four movements:
 . displacement along X
 . displacement along Y
 . lifting the load above the depositing plane in the storage cells
 . switching over the sets of wheels.

While this invention has been described in detail with reference to a certain preferred embodiment, it should be appreciated that the present invention is not limited to that precise embodiment. Rather, in view of the present disclosure, many modifications and variations would present themselves to those of skill in the art without departing from the scope and spirit of this invention, as defined in the appended claims.

What is claimed is:

1. Automated stores in the form of a unit comprising a plurality of superimposed levels (1a, 1b, 1c. .), each level being subdivided into parallel corridors (2a, 2b, 2c. .) on either side of which are arranged rows of racks or cells forming storage zones (3) whose dimensions are a function of products to be stored, the products being positioned in and removed from the storage zones (3) by autonomous trucks (4) being brought to a predetermined level by at least one lift unit (5), and each storage level (1a, 1b, 1c. .) including a set of rails forming networks, one pointing along a longitudinal X axis of the stores inside inter-column spaces (2a, 2b, 2c. .) and the other pointing along a transverse Y axis;

the autonomous trucks (4) including two permutable chassis (8, 9) each equipped with sets of wheels (11, 12), one set (11) being associated with the rails pointing along the X axis the other set (12) being associated with the rails pointing along the Y axis;

the networks pointing along the longitudinal X axis of the stores and along the transverse Y axis comprising:

a plurality of networks (6) pointing along the longitudinal X axis of the stores inside each inter-column space (2a, 2b, 2c. . .); and a single network (7) pointing along the transverse Y axis perpendicular to and at an end of the inter-column spaces (2a, 2b, 2c. . .); said autonomous trucks (4) further including two-way fork means on which the product to be handled rests in order to position it in and extract it from a particular storage zone.

2. The automated stores according to claim 1 wherein said two chassis (8, 9) which can move with respect to one another along a vertical axis are further characterized in that one of the chassis (8) includes driving wheels ($11_1$) and supporting wheels (11) making it possible to provide displacements along the X axis of the stores, and further includes rollers for lateral guidance along the X and Y axes; and the other chassis (9) includes driving wheels ($12_1$) and supporting wheels (12) making it possible to provide displacements along the Y axis, and further includes said two-way fork means on which the product to be handled rests so as to be positioned in or extracted from a particular storage zone.

* * * * *